(12) United States Patent
Grant

(10) Patent No.: US 8,576,171 B2
(45) Date of Patent: Nov. 5, 2013

(54) SYSTEMS AND METHODS FOR PROVIDING HAPTIC FEEDBACK TO TOUCH-SENSITIVE INPUT DEVICES

(75) Inventor: Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 169 days.

(21) Appl. No.: 12/856,280

(22) Filed: Aug. 13, 2010

(65) Prior Publication Data

US 2012/0038582 A1   Feb. 16, 2012

(51) Int. Cl.
*G06F 3/033* (2013.01)
*G09G 5/08* (2006.01)
*G06F 3/041* (2006.01)

(52) U.S. Cl.
USPC .......................................... 345/163; 345/173

(58) Field of Classification Search
USPC .................................. 345/174, 163
See application file for complete search history.

(56) References Cited

U.S. PATENT DOCUMENTS

| | | | |
|---|---|---|---|
| 4,127,752 A | 11/1978 | Lowthorp | |
| 4,692,756 A | 9/1987 | Clark | |
| 4,782,327 A | 11/1988 | Kley et al. | |
| 4,791,416 A | 12/1988 | Adler | |
| 4,798,919 A | 1/1989 | Miessler et al. | |
| 4,821,030 A | 4/1989 | Batson et al. | |
| 4,983,786 A | 1/1991 | Stevens et al. | |
| 5,053,585 A | 10/1991 | Yaniger | |
| 5,086,296 A | 2/1992 | Clark | |
| 5,237,327 A | 8/1993 | Saitoh et al. | |
| 5,241,308 A | 8/1993 | Young | |
| 5,293,158 A | 3/1994 | Soma | |
| 5,355,148 A | 10/1994 | Anderson | |
| 5,496,174 A | 3/1996 | Garner | |
| 5,521,336 A | 5/1996 | Buchanan et al. | |
| 5,729,249 A | 3/1998 | Yasutake | |
| 5,767,457 A | 6/1998 | Gerpheide et al. | |
| 5,887,995 A | 3/1999 | Holehan | |
| 5,917,906 A | 6/1999 | Thornton | |
| 5,943,044 A | 8/1999 | Martinelli et al. | |
| 5,988,902 A | 11/1999 | Holehan | |
| 6,225,976 B1 | 5/2001 | Yates et al. | |
| 6,819,312 B2 | 11/2004 | Fish | |
| 6,924,787 B2 * | 8/2005 | Kramer et al. | ................. 345/156 |

(Continued)

OTHER PUBLICATIONS

Pogue, David, "The Ultimate Apple iPhone User Guide / Everything You Need to Know to Use an iphone," PC Advisor, Dec. 18, 2007, http://www.pcadvisor.co.uk/news/mobile-phone/11635/the-ultimate-apple-iphone-user-guide/?pn=11.*

(Continued)

*Primary Examiner* — Dwayne Bost
*Assistant Examiner* — Larry Sternbane
(74) *Attorney, Agent, or Firm* — Kilpatrick Townsend & Stockton LLP

(57) ABSTRACT

Systems and methods for providing haptic feedback to touch-sensitive input devices are disclosed. For example, one disclosed system includes an input device having a housing having an exterior surface; a touch-sensitive surface configured to transmit a contact signal indicating a contact with the touch-sensitive surface; a sensor disposed within the housing, the sensor configured to sense movement of the input device and to transmit a sensor signal indicating movement of the input device; an actuator disposed within the housing, the actuator configured to output a haptic effect based on an actuator signal, the actuator signal based at least in part on the contact signal.

27 Claims, 10 Drawing Sheets

(56) References Cited

U.S. PATENT DOCUMENTS

| | | | |
|---|---|---|---|
| 6,970,159 B2* | 11/2005 | Gray | 345/163 |
| 7,292,227 B2 | 11/2007 | Fukumoto et al. | |
| 7,956,847 B2* | 6/2011 | Christie | 345/173 |
| 2008/0048997 A1* | 2/2008 | Gillespie et al. | 345/174 |
| 2010/0156818 A1* | 6/2010 | Burrough et al. | 345/173 |
| 2010/0231550 A1* | 9/2010 | Cruz-Hernandez et al. | 345/174 |
| 2010/0245246 A1* | 9/2010 | Rosenfeld et al. | 345/163 |
| 2011/0109552 A1* | 5/2011 | Yasutake | 345/163 |
| 2011/0195781 A1* | 8/2011 | Chen et al. | 463/37 |

OTHER PUBLICATIONS

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," Presence, 4(4):387-402, 1995.

Minsky, "Computational Haptics: The Sandpaper System for Synthesizing Texture for a Force-Feedback Display," Ph.D. Dissertation, MIT, Jun. 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Rabinowitz et al., "Multidimensional tactile displays: Identification of vibratory intensity, frequency, and contactor area," Journal of The Acoustical Society of America, vol. 82, No. 4, Oct. 1987.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

SMK Corporation, "Force Feedback Type Optical Touch Panel Developed," SMK Corporation Website, Oct. 30, 2002.

* cited by examiner

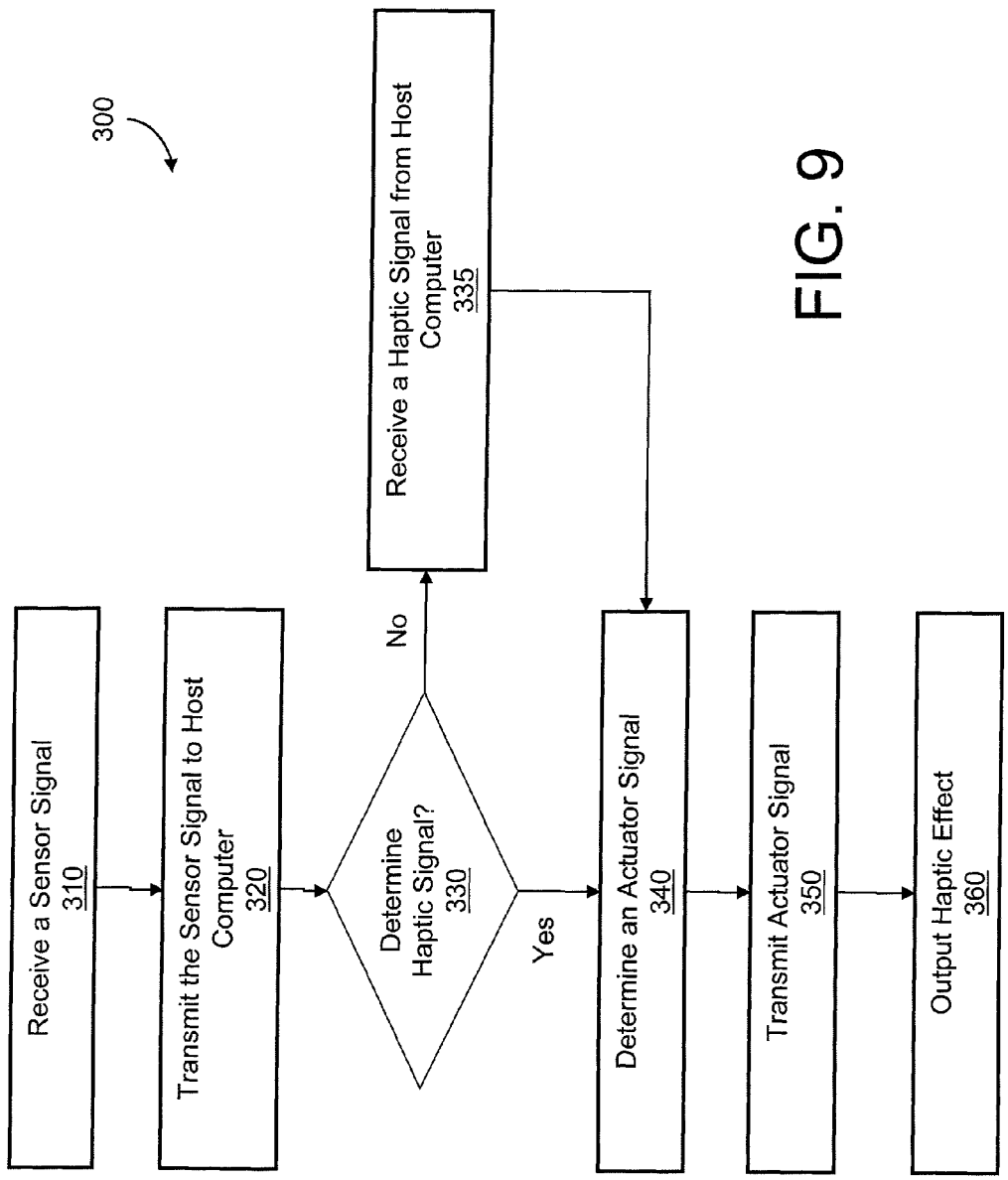

SYSTEMS AND METHODS FOR PROVIDING HAPTIC FEEDBACK TO TOUCH-SENSITIVE INPUT DEVICES

FIELD OF THE INVENTION

The present invention generally relates haptic feedback, and more particularly to providing haptic feedback to touch-sensitive input devices.

BACKGROUND

Using an interface device, a user can interact with a computer system to perform functions and tasks on the computer, such as playing a game, experiencing a simulation or virtual reality environment, performing computer aided design, operating a graphical user interface (GUI), or otherwise influencing events or images displayed on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, force feedback or tactile feedback is also provided to the user, also known more generally herein as "haptic feedback." These types of interface devices can provide physical sensations that are felt by a user using the controller or manipulating the interface device. One or more actuators may be used in the device and may be connected to the controlling computer system. The computer system controls forces on the haptic feedback device, typically in conjunction with displayed events and interactions on the host by sending control signals or commands to the haptic feedback device and the actuators. One example of an interface device providing haptic feedback is a computer mouse having an actuator and providing haptic effects corresponding to graphical events displayed on a computer screen, such as an explosion in a video game.

With some interface devices, a user interacts with a graphical environment displayed by a computer system through contact with a touch-sensitive device, such as a touchpad or a touch screen. For example, laptop computers are often equipped with a touchpad that allows users to control a graphical object, such as a cursor or pointer, by placing a finger on the touchpad and moving the finger along the surface of the touchpad in a chosen direction. Recently, touch-sensitive computer mice have been developed that allow a user to interact with a graphical environment by simultaneously moving the mouse and performing touch gestures on a surface of the mouse, such as Apple Inc.'s Magic Mouse. While some touch-sensitive input devices only accurately recognize and capture a single touch contact, multi-touch touch-sensitive input devices can accurately recognize and capture multiple simultaneous touch contacts. For example, zooming in and out may be accomplished by placing two fingertips on a touchpad in positions separate from each other and moving the fingertips across the surface of the touchpad toward each other, and vice-versa.

SUMMARY

Embodiments of the present invention provide systems and methods for providing haptic feedback to touch-sensitive input devices. For example, in one embodiment, an input device comprises: a housing having an exterior surface; a touch-sensitive surface configured to transmit a contact signal indicating a contact with the touch-sensitive surface; a sensor disposed within the housing, the sensor configured to sense movement of the input device and to transmit a sensor signal indicating movement of the input device; an actuator disposed within the housing, the actuator configured to output a haptic effect based on an actuator signal, the actuator signal based at least in part on the contact signal.

This illustrative embodiment is mentioned not to limit or define the invention, but rather to provide an example to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 9 is a flow chart illustrating a method for providing haptic feedback to touch-sensitive input devices according to one embodiment of the present invention.

DETAILED DESCRIPTION

Figure 1:
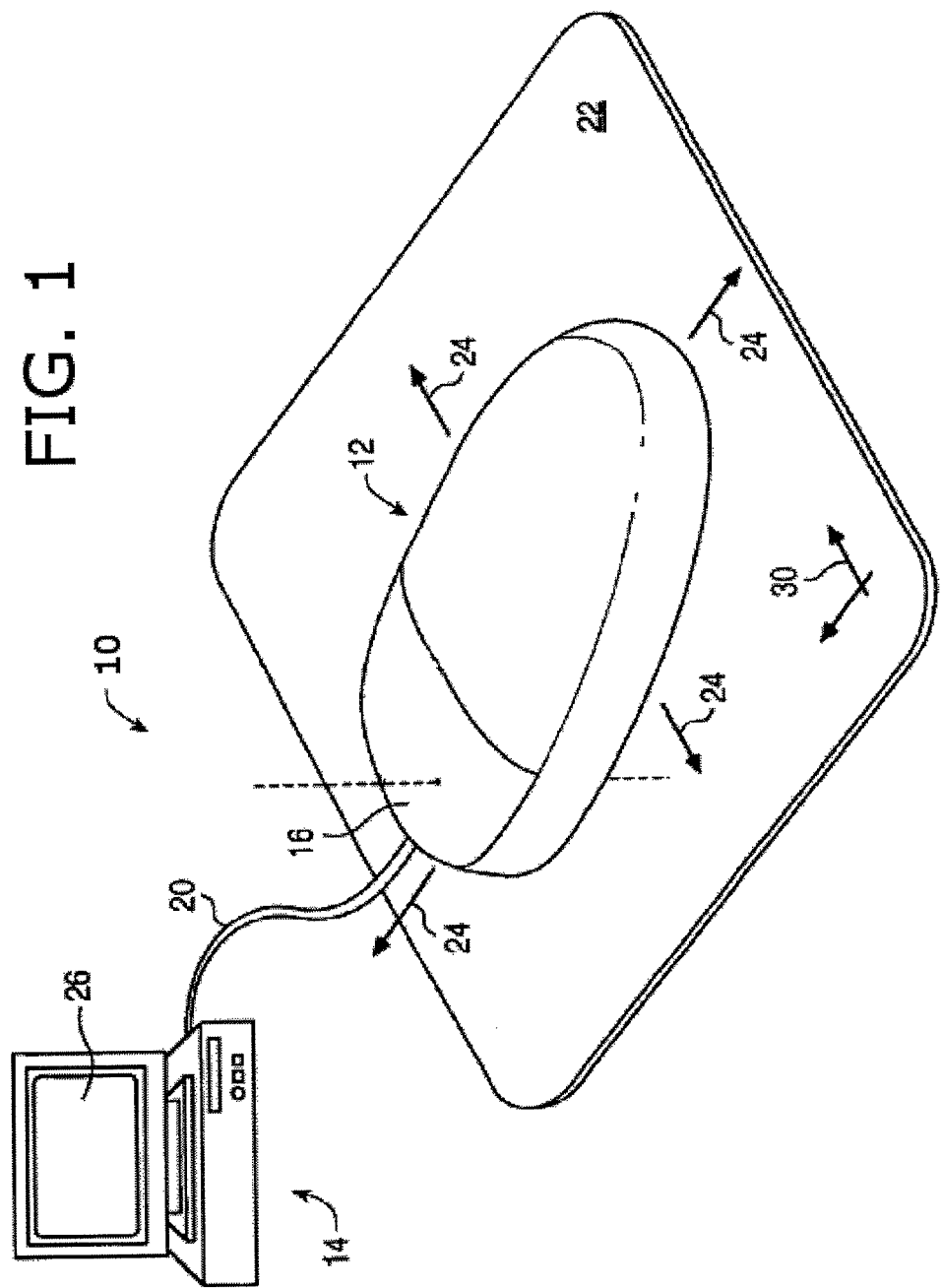
FIG. 1 shows a system for providing haptic feedback to touch-sensitive input devices according to one embodiment of the present invention.

Embodiments of the present invention provide systems and methods for providing haptic feedback to touch-sensitive input devices.

Illustrative Embodiment of a System for Providing Haptic Feedback to Touch-Sensitive Input Devices One illustrative embodiment of the present invention comprises a haptic feedback mouse having a touch screen. In this embodiment, the touch screen is disposed within the upper surface of the mouse such that a user may manipulate the mouse using conventional techniques, but may also use the touch screen by using one or more fingers of the same hand used to manipulate the mouse. The illustrative mouse is connected to a computer that is executing a software application. The mouse is configured to be movable in a planar workspace by a user and to detect touch contacts representing inputs from the user thereby allowing the user to interact with the software application, such as video game of the first-person shooter genre. In this embodiment, a sensor detects the movement of the mouse, the touch screen detects touch contacts and gestures, and a local processor within the mouse communicates with the host computer by transmitting signals including sensor or touch contact information and receiving signals including haptic effects or actuator signals. Based on these signals, the host computer performs actions within the video game and updates the graphical environment.

For example, when the user moves the mouse, the sensor detects the movement of the mouse and transmits a sensor signal to the local processor. Likewise, when the user makes contact with the touch screen, the touch screen detects the contact and transmits a contact signal to the local processor. Based on the signals received from the sensor or the touch screen, the local processor generates and transmits user input signals to the computer to which the mouse is connected. The connection between the mouse and the computer may be a wired connection, such as a Universal Serial Bus (USB) connection, or a wireless connection, such as a Bluetooth connection. Upon receiving the user input signals, the computer performs actions within the video game and updates the graphical environment representing the video game. For example, in response to a movement of the mouse, the first-person view of the controlled character is updated as if the character is changing the direction he is looking based on both the direction and speed of the mouse movement. In another example, in response to a user making contact with and moving his finger along the surface of the touch screen from front to back, the graphical representation of the character is updated to show the character drawing a bow and arrow. When the user lifts his finger from the surface of the touch screen, the graphical representation of the character is updated to display the arrow being fired from the bow. Alternatively, in response to a user making a circular motion with his finger on the surface of the touch screen, the graphical representation of the character is updated to display the character holding a fireball that grows in size and power as the user continues to make the circular motion. Then, in response to the user quickly moving his finger along the surface of the touch screen in a direction (e.g. a "flick"), the graphical representation is updated to display the user-controlled character throwing the fireball.

In addition, to provide a realistic feel to the user, the mouse outputs haptic effects associated with the character's actions or graphical events encountered in the video game. The computer determines the appropriate haptic effect and outputs a signal comprising the haptic effect to the mouse. For example, when the user shoots a bow and arrow as described above, the mouse outputs an increasing-magnitude vibration when drawing the drawstring. Such feedback provides a user both with confirmation that the desired action is occurring as well as an indication of the strength of the shot. Upon releasing an arrow, the mouse may output a sharp popping sensation to indicate a successful shot. In another example, when the user creates a fireball as described above, the mouse outputs a vibration that increases in intensity as the fireball gets larger and more powerful. When the user shoots the fireball, the vibration may rapidly decrease to indicate to the user that the fireball has been fired and to indicate that the fireball is travelling away from the user's character.

In addition, the touch screen is used to provide context sensitive touch input capabilities and data corresponding to the video game. As the user directs the controlled character through the graphical environment of the video game, the touch screen may display information based on the game. For example, when the controlled character acquires additional weapons, the touch screen displays a visual representation of the newly available weapon. The user may then touch the touch screen to select the new weapon for use. The user then receives haptic confirmation, such as a low-intensity vibration, to indicate that the weapon was selected and the game display is updated to show the user's character with the new weapon equipped. In another example, the user is able to cycle through available weapons by swiping a finger horizontally across a region of the touch screen. The touch screen displays visual representations of the weapons moving horizontally across the region in relation to the swipe. As the user cycles through weapons, the mouse outputs brief, low-intensity vibrations, such as detents, each time a weapon is cycled. If the user pauses on a particular weapon, the mouse outputs a vibration with an intensity based on the relative strength of the weapon or the type of weapon. When the user selects a weapon, such as by tapping the touch screen, the mouse outputs a strong, short-duration vibration to confirm that the weapon was selected, or a longer-duration, strong vibration to indicate that the weapon could not be equipped.

In other embodiments, to further enhance the realistic feel multiple haptic effects may be provided simultaneously. For example, as a user places and holds a finger on the touch screen to continuously fire an automatic machine gun, the mouse provides repeating pulses or pops to the touch screen for each round fired to simulate the experience of shooting the automatic machine gun. Alternatively, the mouse may output a vibration to indicate that the current magazine is empty.

Such a mouse may allow a user to more effectively interact with a host computer system. By providing a mouse with a haptically-enabled touch-sensitive surface, a user may be able to exert greater control over applications executed by the host computer and receive non-visual confirmation of actions or alerts that may allow the user to more quickly respond to events. For example, as described above, the user may be able to effectively browse available options in a computer program, receive information about each option, and select an option without needing to see the available options. In addition, the user may be able to execute complicated actions within environments, such as video games, without the need for complicated key strokes or chords. Further, haptic feedback associated with such actions may allow the user more precise control over the action input through the touch sensitive input device, such as by gauging the intensity of an attack by the haptic effect felt through the mouse.

This illustrative example is given to introduce the reader to the general subject matter discussed herein. The invention is not limited to this example. The following sections describe various additional non-limiting embodiments and examples of systems and methods for providing haptic feedback to touch-sensitive input devices.

Figure 2:
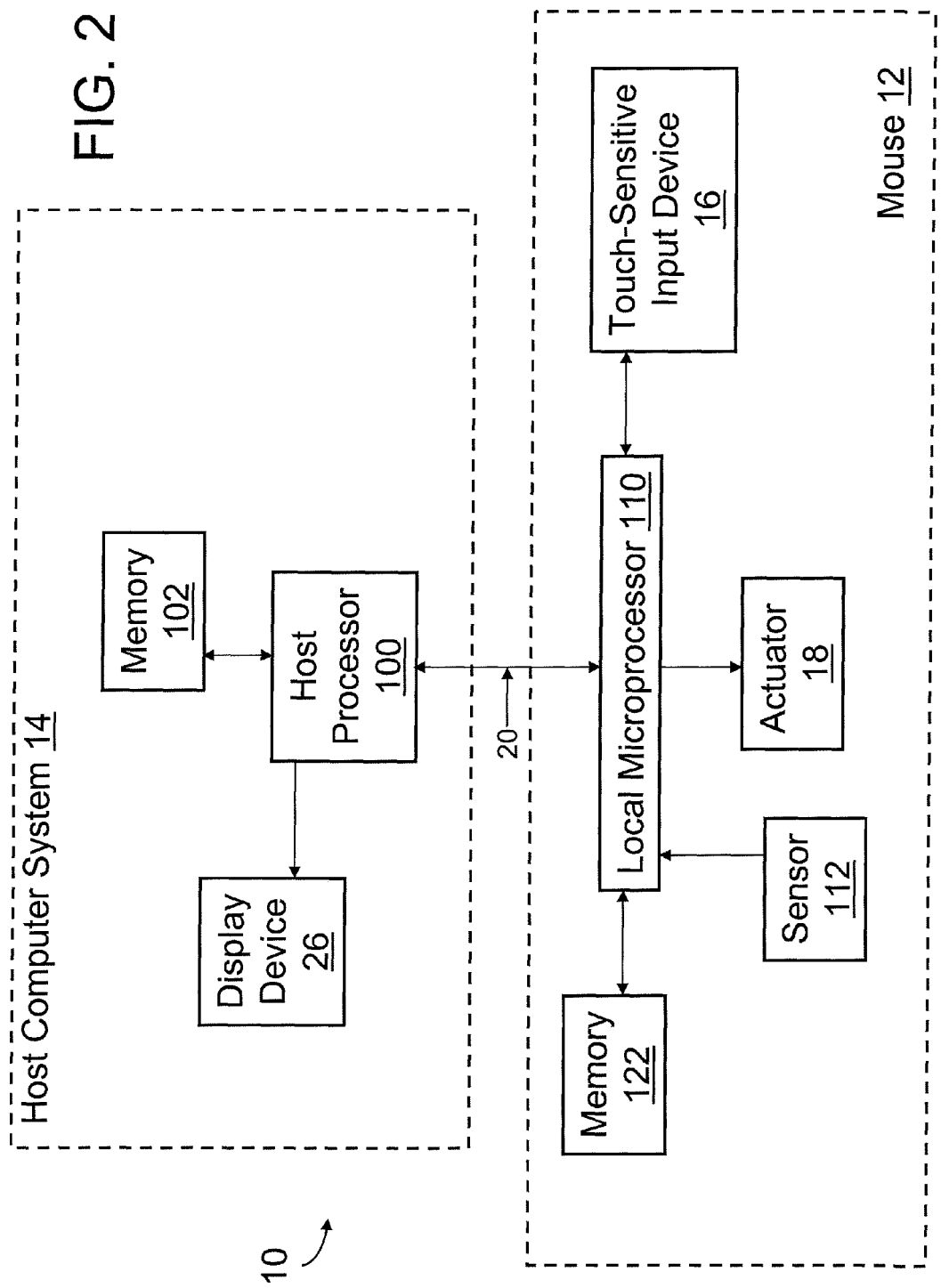
FIG. 2 shows a system for providing haptic feedback to touch-sensitive input devices according to one embodiment of the present invention.

Systems and Methods for Providing Haptic
Feedback to Touch-Sensitive Input Devices Referring now to the drawings, in which like numerals indicate like elements throughout the several figures, FIGS. 1 and 2 show a system 10 for providing haptic feedback to touch-sensitive input devices according to one embodiment of the present invention. The system 10 comprises an input device 12 in communication with a host computer system 14. For simplicity, the embodiments described herein generally use mouse-like input devices to illustrate the present invention. However, the present disclosure is not limited to mouse-like input devices, but also includes input devices moveable in one or more degrees of freedom. For example, the input device may be a motion sensitive hand-held device available moveable in 6 or more degrees of freedom and capable of providing input to a video game, simulation, or other type of software program. Examples of such embodiments include input devices in a form similar to traditional video game controllers, including controllers such as a Wii™ remote or a Sony® SixAxis™ controller, as well as controllers shaped as tennis rackets, golf clubs, baseball bats, baseball gloves, swords, and shields. In the embodiment shown in FIG. 1, the input device 12 is in communication with the computer system 14 using a USB connection. However, in other embodiments, the input device 12 may communicate with the computer system 14 using other wired or wireless communication methods known to those of skill in the art, such as Bluetooth, ZigBee, or serial communication. In the embodiment shown in FIG. 1, input device 12 may be moved within a substantially planar workspace (as indicated by axes 30). However, in come embodiments, the input device 12 may be moveable in other degrees of freedom, including 3 or more degrees of freedom.

In the embodiment shown in FIG. 1, the input device 12 comprises a housing, a sensor 112, an actuator 18, and a touch-sensitive surface 16. In some embodiments, input device 12 also comprises a processor 110 and a memory 122 as discussed in more detail below. In some embodiments, the processor 110 is configured to execute program code stored in the memory 122. As described above, the input device 12 may be physically moved within a substantially planar workspace. For example, a user may move input device 12 to provide planar two-dimensional input to a computer system 14 to correspondingly move a computer generated graphical object, such as a cursor or other image, in a graphical environment provided by host computer 14 or to control a virtual character, vehicle, or other entity in a game or simulation. In addition, a user may interact with the touch-sensitive surface 16 to provide to the host computer system 14 independently of input generated by moving the input device 12 within the planar workspace. In other embodiments (not shown), the input device may be moved in only one degree of freedom, or in three or more degrees of freedom to correspondingly move a computer generated graphical object in a graphical environment or to control a slave device, such as a robotic arm or other machine.

In the embodiment shown in FIG. 1, touch-sensitive surface 16 is configured to detect contact with the touch-sensitive surface 16 and for generating a signal indicating a location of the contact on the touch-sensitive surface 16. In some embodiments, the touch-sensitive surface 16 may comprise a touchpad. However, other embodiments may comprise an array of capacitive buttons or a touch screen capable of displaying graphical information. In the embodiment shown in FIG. 1, the touch-sensitive surface 16 is a multi-touch touch-sensitive surface. A multi-touch touch-sensitive surface is configured to detect a single contact with the touch-sensitive surface, or to detect multiple, substantially-simultaneous contacts with the touch-sensitive surface and to provide a signal having information associated with one or more of the multiple points of contact. However, in some embodiments, the touch-sensitive surface 16 may be a single-touch touch-sensitive surface that is operable to detect only a single contact at a time.

As is known in the art, a variety of types of contacts or gestures may be detected. For example, a touch contact may comprise a brief contact and release, such as a tap. In some embodiments, a touch contact may also comprise making contact and making a gesture along the surface of the touch-sensitive surface while maintaining contact with the touch-sensitive surface, such as a "drag" gesture. In addition, in some embodiments, the touch-sensitive surface 16 may be operable to detect a pressure or pressures applied to the touch-sensitive surface 16 by a single-touch or multi-touch contact or gesture. Additional variations of touch contact are well known to those skilled in the art.

In some embodiments, touch contacts detected by the touch-sensitive device 16 may be converted into contact signals comprising touch contact information and transmitted to the host computer 14. In some embodiments, the touch contact information may also include touch contact pressure data. For example, as described above, the touch sensitive surface may be configured to detect contacts and pressures at one or more locations. Thus, the touch contact information may comprise a location (or locations) of a contact or contacts as well as one or more pressures associated with the contact(s). The host computer 14 is configured to receive contact signals comprising touch contact information from the input device 12 and to take actions based on such contact signals. For example, in some embodiments, the host computer 14 may be programmed to provide recognition of gestures associated with touch contacts with the touch-sensitive surface 16. Further, in some embodiments, a local processor within the input device 12 may be configured to determine a gesture based on touch contacts with the touch-sensitive surface 16. For example, a computer program executed by the host computer 14 that displays pages of a book or other document may be configured to recognize a specific gesture associated with a touch contact, such as a finger placed in contact with the touch-sensitive surface 16 and moved horizontally left or right (a finger drag), for flipping pages. Similarly, a computer program may recognize horizontal or vertical finger drags for scrolling through a document vertically or horizontally. In such an embodiment, the input device 12 may be configured to output detent effects to the touch-sensitive surface 16 as each page is flipped. In a related embodiment, the computer program may further recognize repeated finger drags in the same direction and provide a momentum or acceleration effect to the scrolling. In such an embodiment, the input device 12 may output a vibration, in addition to detents, to indicate that the page flipping has momentum or is accelerating. In another related embodiment, a computer program may determine the number of pages to flip in response to a single finger drag based on the level of pressure applied to the touch-sensitive surface 16 during the finger drag and may vary the intensity of a corresponding haptic effect based on the applied pressure.

In other embodiments, the host computer 14 may provide varying functionality based on a recognized gesture associated with a touch contact and based on a region of the surface of touch-sensitive surface 16. For example, in one embodiment, the host computer 14 may interpret a touch contact to small region, such as an upper right corner of a square or rectangular touch-sensitive surface, as a traditional right mouse click, and may interpret a contact to the remaining area of the touch sensitive input device as a traditional left mouse click. In such an embodiment, the input device 12 may output a single pop to indicate a left click or two pops to indicate a right click. In another embodiment, the host computer 14 may interpret a touch contact, such as a tap or a finger drag, in a left region of the touch-sensitive surface 16 as a page flip and interpret a similar touch contact in a right region as a smooth scrolling motion.

In some embodiments, the touch-sensitive surface 16 may comprise a touch screen input device. In one embodiment, the touch-sensitive surface 16 is configured to display graphical information, such as a graphical representation of user controls. The graphical information may be controlled by the host computer 14, such as by sending one or more display signals comprising display information to the input device 12, which may then cause the touch-sensitive surface to display graphical information based on the display signal(s). In some embodiments, the graphical representation may be controlled by the input device 12. For example, in one embodiment, the input device 12 may provide a default graphical representation of user controls in instances where the host computer 14 does not transmit signals comprising display information. In such an embodiment, the input device 12 generates a display signal and transmits the signal to the touch-sensitive surface 16 to cause the touch-sensitive surface 16 to display the default graphical representations. For example, the default graphical representation may comprise graphical representations of traditional mouse controls such as right and left buttons and a wheel used for scrolling. Such an embodiment may comprise a plurality of haptic effects associated with controls of the default configuration. In some embodiments, the host computer 14 may transmit signals comprising context sensitive display information such that the graphical representation of controls on the touch-sensitive surface 16 are based on the user's activities with respect to an application executed by the host computer 14. In such an embodiment, the host computer 14 may also comprise haptic effects associated with the context-sensitive controls. In other embodiments, the touch screen may provide a visual or haptic confirmation upon recognition of a touch contact.

As described above, input device 12 comprises at least one actuator configured to output tactile sensations to the input device 12, such as the housing or a portion thereof, or the touch-sensitive surface 16. In some embodiments, the input device 12 comprises a plurality of actuators. In one embodiment, the input device 12 comprises a first actuator and a second actuator where the first actuator is configured to output a haptic effect to the touch-sensitive surface and the second actuator is configured to output a haptic effect to the housing. In some embodiments, a plurality of actuators may be configured to output haptic effects to the touch-sensitive surface. Haptic effects may be used to provide haptic feedback for a variety of purposes. For example, haptic effects may be used to confirm successful input of a touch command or may be used to simulate events occurring in a displayed graphical environment, such as an explosion in a video game. In some embodiments, the haptic effects may comprise kinesthetic effects to resist or assist movement of the input device 12 within the workspace. Embodiments of actuators disposed within the input device is described in greater detail below with reference to FIGS. 3A-8. As described above, and in more detail below, haptic effects output to an input device comprising a touch-sensitive surface may allow a user to exert better, more accurate control over an application.

Figure 3A:
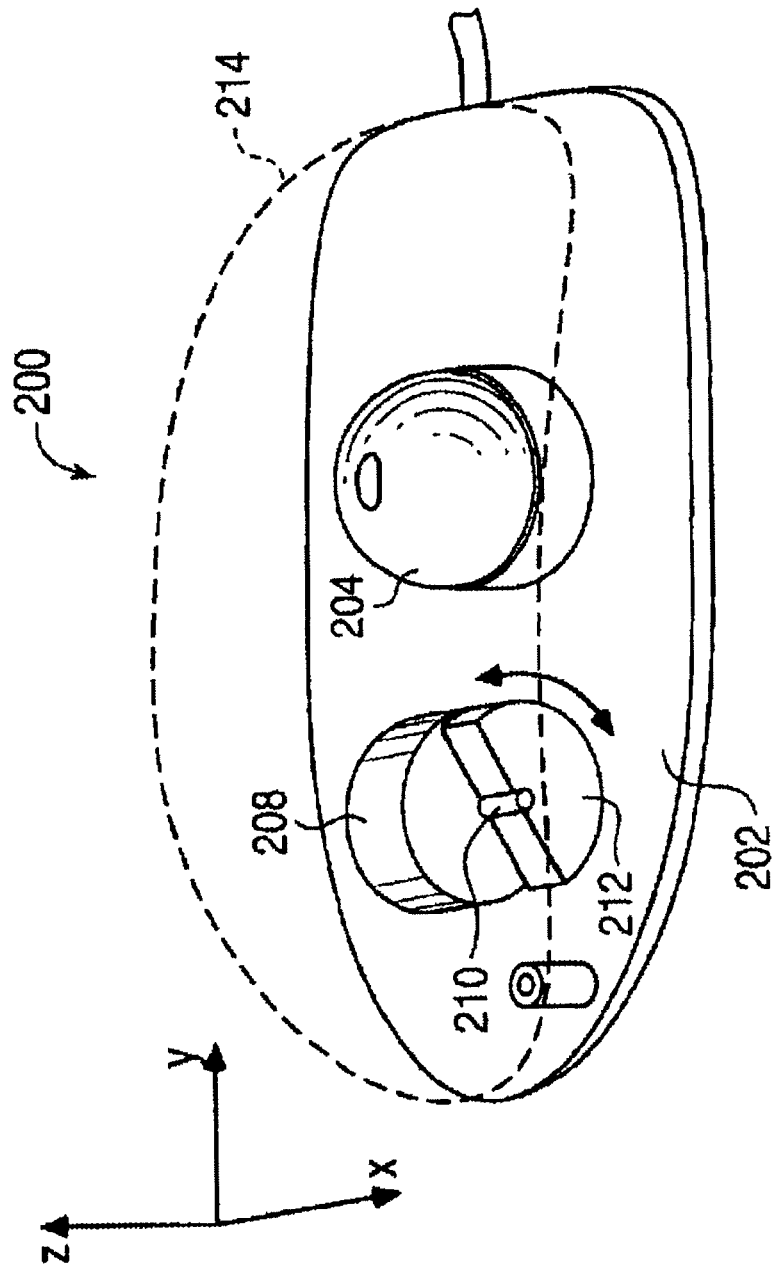
FIGS. 3A-8 show a touch-sensitive input device according to one embodiment of the present invention.

In the embodiment shown in FIG. 1, input device 12 rests on a ground surface 22 such as a tabletop or mousepad. However, in some embodiments, the input device 12 may be configured to be held in a user's hand, or by two hands, and to be manipulated in one or more degrees of freedom without a ground surface. In the embodiment shown in FIG. 1, a user grasps the input device 12 and moves the input device 12 in a planar workspace on the surface 22 as indicated by arrows 24. Input device 12 may be moved on the ground surface 22, picked up and placed in a different location, etc. In the embodiment shown in FIG. 1, the input device comprises a sensor, such as an optical sensor as illustrated in FIG. 3A, to detect movement of the input device 12 within the planar workspace and to generate one or more movement signals, which may be sent to the host computer 14, such as over a communication link 20 as is well known to those skilled in the art. In other embodiments, different mechanisms and/or electronics can be used to convert input device motion to position or motion signals received by the host computer. For example, in some embodiments, the input device 12 comprises one or more optical sensors. In one embodiment, input device 12 is a relative device. In such an embodiment, the sensor is configured to detect a movement of the input device 12. In some such embodiments, the detected movement of the input device 12 may be movement in one or more degrees of freedom. However, in one embodiment, input device 12 is an absolute input device, such that the sensor may detect the absolute position of the input device 12. In such an embodiment the input device is typically limited to a bounded workspace.

In the embodiment shown in FIG. 1, host computer 14 comprises a processor and a memory (not shown). The processor is configured to execute program code stored in the memory. In one embodiment, the host computer comprises a personal computer or workstation, such as a PC compatible computer or Macintosh personal computer, a Linux desktop computer, or a Sun or Silicon Graphics workstation. For example, in some embodiments, the host computer 14 is configured to execute the Windows™, MacOS™, Linux, Unix, or MS-DOS™ operating systems. In some embodiments, host computer 14 can be a video game console system. As is known in the art, such video game consoles are typically configured to be connected to a television set or other display. Suitable video game consoles include systems available from Nintendo, Microsoft, or Sony. In other embodiments, host computer system 14 comprises a "set top box" that can be used, for example, to provide interactive television functions to users, or a "network-" or "internet-computer" which allows users to interact with a local or global network using standard connections and protocols such as used for the Internet and World Wide Web. In one embodiment, host computer 14 is configured to execute a host application program with which a user is interacting using input device 12. For example, in various embodiments the host application program may comprise a video game, word processor or spreadsheet, Web page or browser that implements HTML or VRML instructions, scientific analysis program, virtual reality training program or application, or other application program that utilizes input of input device 12 and outputs haptic feedback commands to the input device 12. Herein, for simplicity, operating systems such as Windows®, MS-DOS, MacOS, Linux, etc. are also referred to as "application programs." In one embodiment, an application program uses a graphical user interface (GUI) to present options to a user and receive input from the user.

Herein, host computer 14 may be referred as providing a "graphical environment," which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the touch-sensitive surface 16 and sensors of input device 12, and outputs force values and/or commands to be converted into haptic effects by input device 12. In embodiments wherein the touch-sensitive surface comprises a touch screen, the host application program may output display commands or signals to be converted into graphical representation of controls or data to be displayed by the touch screen.

FIG. 3A is a perspective view of a input device 200 providing tactile sensations to a user with an eccentric rotating mass to provide inertial forces, such as vibrations. A lower base portion 202 of the input device housing can include an optical sensor 204, circuits (not shown), and other standard components. In addition, a rotary motor 208 can be coupled to the base 202, where a rotary shaft 210 of the motor is coupled to an eccentric mass 212 positioned so that the center of mass of the mass 212 is offset from the center of rotation of the shaft 210. In another embodiment, a rotary motor 208 may be coupled to the touch-sensitive surface 16. A cover portion 214, shown in dashed lines, can be normally positioned over the base portion 202.

The eccentric mass 212 is rotated by the motor 208 to cause inertial tactile sensations on the input device housing. The inertial sensations are caused by the inertia produced by the eccentric rotation of the mass, which causes a wobbling motion that is transmitted through actuator to the housing. The user contacting the housing can feel the sensations. The sensations can be determined from host commands, signals, or local determination, as explained above. In one embodiment, the mass 212 is rotated in a single direction. In another embodiment, the mass 212 can be rotated in two directions. Some input device embodiments can allow both uni-directional and bi-directional modes, e.g. a host command from the host computer 14 can select which mode to use.

The embodiment 200 can produce strong forces to the user if the mass 212 is rotated quickly. In some embodiments, forces output to the user can be dependent on the initial state of the motor/mass. For example, if the eccentric mass were initially positioned at the bottom of its rotational range, a "pop" sensation (e.g. one or a small number of quick mass rotations) would feel different than if the mass were initially positioned at the top of its range. Rotating mass control firmware and a sensor that reads mass rotational position may be used to improve the eccentric mass control and make particular force sensations always feel the same. By using a harmonic drive, in which the mass is driven in both directions about its rotational axis, higher-fidelity force effects may, in general, be obtained. Also, firmware or control software can be used to translate low frequency periodic drive signals into short duration pulses that start the mass moving from a known position.

In some embodiments, the eccentric mass 212 can be driven bi-directionally against one or more stop members, such as pins, that are coupled to the base 202 or cover 214 of the input device housing. The impact force of the mass against the stop members causes different types of force sensations that can be provided instead of or in addition to inertial sensations.

Figure 3B:
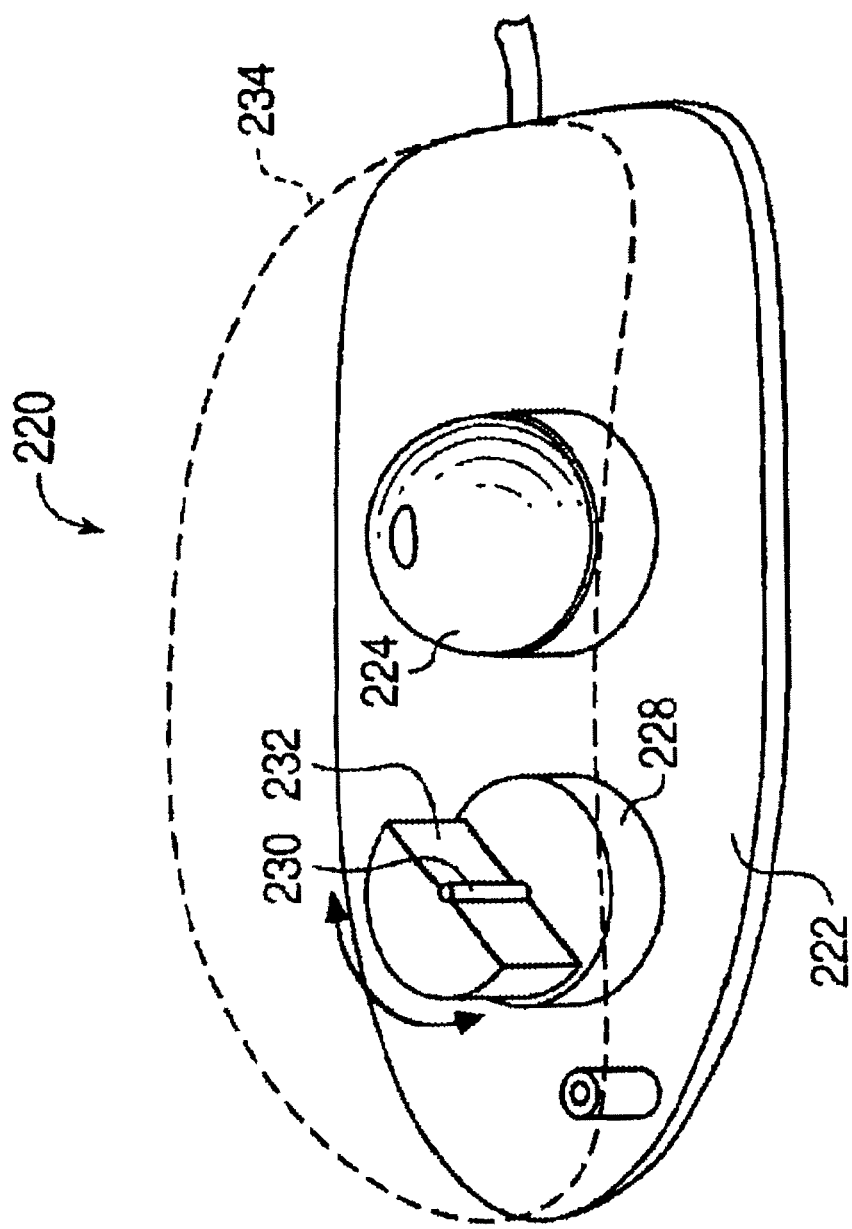

FIG. 3B is a perspective view of an input device 220 providing tactile sensations to a user with an eccentric rotating mass. Embodiment 220 is similar to input device 200 described above, and can include a lower base portion 222, an optical (or other type) sensor 224, circuits (not shown), and other standard components. A rotary motor 228 can be coupled to the base 222, where a rotary shaft 230 of the motor is coupled to an eccentric mass 232 positioned so that the center of mass of the mass 232 is offset from the center of rotation of the shaft 230. A cover portion 234, shown in dashed lines, can be normally positioned over the base portion 222.

Embodiment 220 differs from embodiment 200 in that the motor 228 is positioned such that the shaft 230 is parallel to the z-axis and rotates the eccentric mass 232 in the x-y plane. The inertial sensations are similar to those produced by embodiment 220, except that the forces are provided in the x-y plane.

Figure 4:
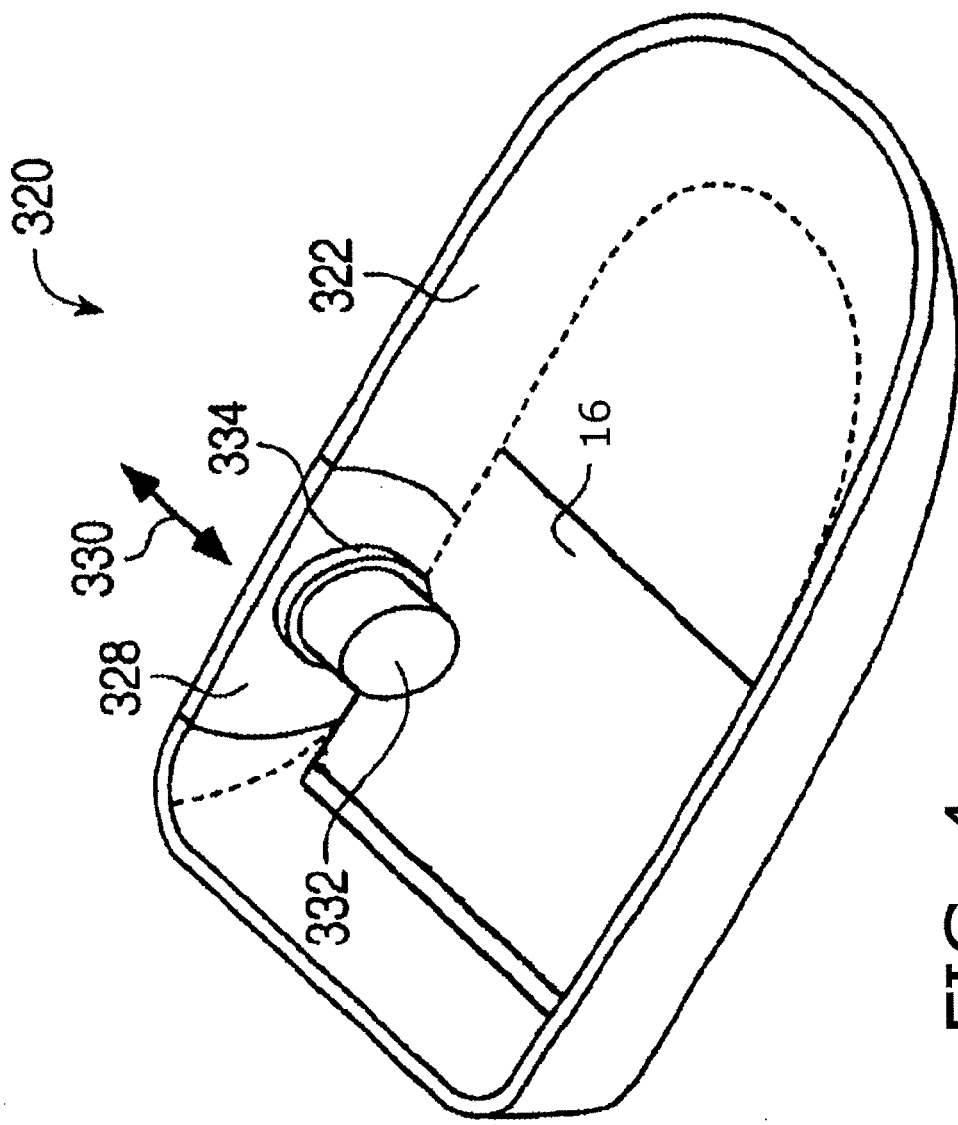

FIG. 4 is a perspective view of another embodiment 320 of the haptic input device of the present invention. The upper portion 322 of input device 320 is shown, which is intended to mate with a bottom portion, e.g. a base similar to those shown with respect to FIGS. 3A and 3B, or other type of base. Touch-sensitive surface 16 is shown from the underside of the cover portion 322.

A linear voice coil 332, or other type of actuator providing linear motion, is coupled to the cover portion 322 (or other portion of the housing). For example, the voice coil 332 can be coupled to an extension 324 of the housing 322. The voice coil 332 includes a linearly-moving bobbin 334 that is directly coupled to the movable portion 328 so that the voice coil actuator 332 directly moves the portion 328. The movable portion 328 also magnetically centers itself in its degree of freedom due to the magnetic characteristics of the voice coil 332.

Since the forces on the user are output only parallel to only one axis of input device movement, such as the x-axis, forces meant for the y-axis can also be output on the x-axis-moving portion 328. The mapping from x-axis and y-axis to a single x-axis may present some perceptual challenges for the user. For example, position-based effects may make less sense to the user in this embodiment than in embodiments providing z-axis or x- and y-axis forces, but still may be entertaining for the user. Clicks and pops are not directional and are well-suited to this embodiment. In some embodiments, a second moveable housing portion and dedicated voice coil actuator, similar to the thumb portion 328 and actuator 332, can be positioned to better map y-axis forces, e.g. such a second movable portion can be positioned on the front or back of the input device housing and contact the user's fingers or palm.

Other embodiments can also be provided. For example, the cover portion, or a designated area of the cover portion, may be moved in the z-direction against the user's palm or fingers by a voice coil actuator or other type of actuator that directly moves the cover portion. The upper portion of the input device housing can be flexibly coupled to the lower portion or base of the input device so that the upper portion can be moved on the z-axis relative to the lower portion. Kinesthetic forces may not be perceived as easily by the user as tactile (e.g. vibration) forces, but this can be remedied by increasing the travel distance of the moving housing portion.

This embodiment may offer advantages in that the user may experience force sensations while operating the input device since the upper cover portion is moved. Some users may not palm the input device in use, but rather grasp the side edges of the input device. To accommodate this, the cover portion can be extended to the side areas or side grip surfaces or ridges can be made more pronounced to enhance feedback from the gap area in this grasp mode. It may not be necessary in some embodiments to palm the input device to receive compelling tactile feedback due to feeling vibrations caused by the moving housing. If only a smaller portion of the upper housing portion is movable, then the user can avoid holding down and overpowering the moving portion. For example, displacing an island of plastic sealed by a bellows can provide just as effective force feedback as displacing the whole upper housing portion.

Furthermore, a gap formed by the split housing, between the upper and lower shells, creates a differentially displaced surface. Since the two portions of input device housing are pinched to provide movement, the user may contact the gap when operating the input device. When the two halves of the housing pinch together or apart, the user receives proportional information due to feeling the size of the gap changing. In other embodiments, a flexible material can be used to fill the gap or the differential information can be conveyed in other ways, such as putting tactile ridges on the upper and lower halves.

Figure 5:
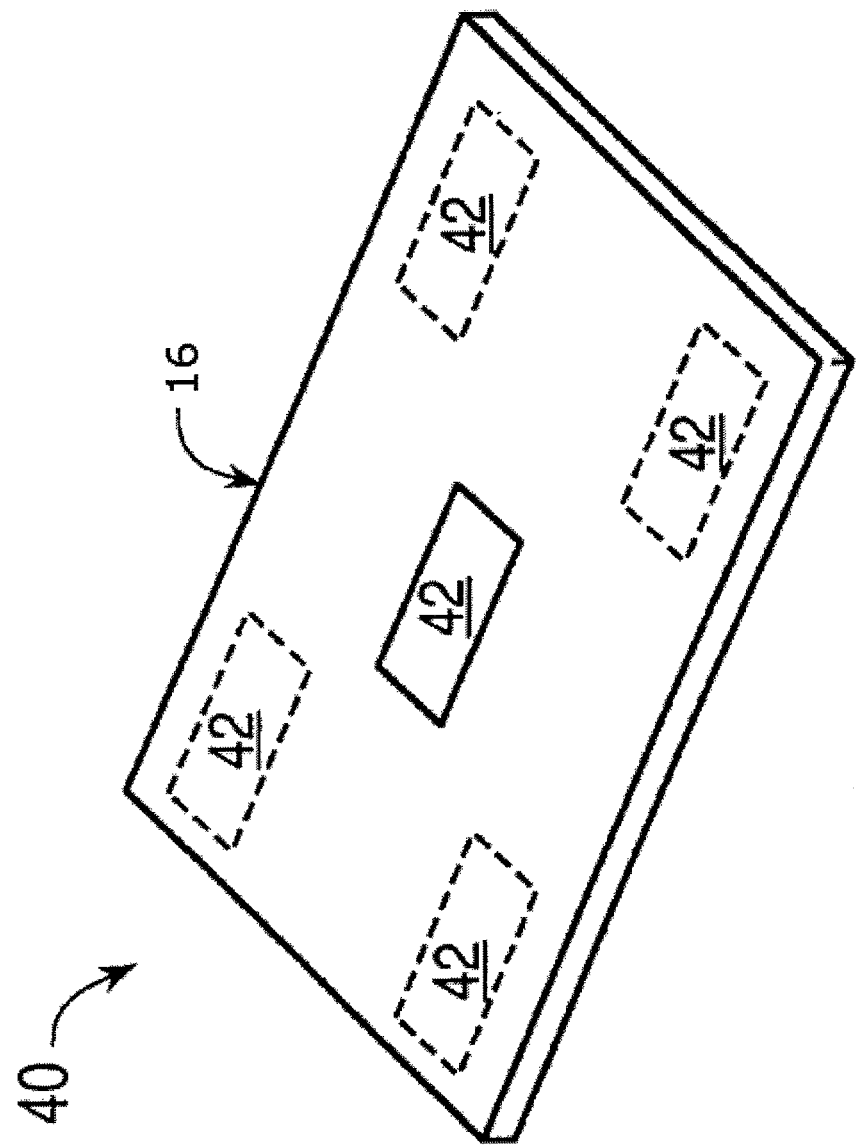

FIG. 5 is a perspective view of a first embodiment 40 of a touch-sensitive surface 16 of the present invention for providing haptic feedback to the user. In this embodiment, one or more piezoelectric actuators 42 are coupled to the underside of the touch-sensitive surface 16. The piezoelectric actuator 42 is driven by suitable electronics, as is well known to those skilled in the art. In one embodiment, a single piezoelectric actuator 42 is positioned at or near the center of the touch-sensitive surface 16, or off to one side if space constraints of the housing require such a position. In other embodiments, multiple piezoelectric actuators 42 can be positioned at different areas of the touch-sensitive surface; the dashed lines show one configuration, where an actuator 42 is placed at each corner and at the center of the touch-sensitive surface 16.

In one embodiment, the piezoelectric actuators 42 can each be configured to output a small pulse, vibration, or texture sensation on the touch-sensitive surface 16 and to the user if the user is contacting the touch-sensitive surface 16. The entire touch-sensitive surface 16 may be moved with the forces output by actuator(s) 42. In one embodiment, the forces output on the touch-sensitive surface 16 are linear (or approximately linear) and along the z-axis, approximately perpendicular to the surface of the touch-sensitive surface 16 and the top surface of input device 12. In a different embodiment, forces can be applied to the touch-sensitive surface 16 to cause side-to-side (e.g., x-y) motion of the touch-sensitive surface 16 in the plane of its surface in addition to or instead of z-axis motion. For example, one linear actuator can provide motion for the x-axis, and a second linear actuator can provide motion for the y-axis and/or the x-axis.

The frequency of a vibration output by an actuator 42 can be varied by providing different control signals to an actuator 42. Furthermore, the magnitude of a pulse or vibration can be controlled based on the applied control signal. If multiple actuators 42 are provided, a stronger vibration can be imparted on the touch-sensitive surface by activating two or more actuators simultaneously. Furthermore, if an actuator is positioned at an extreme end of the touch-sensitive surface and is the only actuator that is activated, the user may experience a stronger vibration on the side of the touch-sensitive surface 16 having the actuator than on the opposite side of the touch-sensitive surface. Different magnitudes and localized effects can be obtained by activating some but not all of the actuators. Since the tip of a user's finger that is touching the touch-sensitive surface is fairly sensitive, the output forces do not have to be of a high magnitude for the haptic sensation to be effective and compelling.

The piezo-electric actuators 42 may have several advantages for the touch-sensitive surface 16. These actuators can be made very thin and small, allowing their use in compact housings that are typical for portable electronic devices. They also require very low power, and are thus suitable for devices with limited power (e.g., powered by batteries). In addition, any other types of smart material actuators may also be used, including electroactive polymers and shape memory alloys. As discussed above, in some embodiments described herein, power for the actuators can be drawn off a bus connecting the input device to the host computer.

In some embodiments, a closed loop control system may be employed to control the piezo-electric actuators 42. In one such embodiment, a sensor may be used to measure the motion of the piezo-electric actuator and transmit a sensor signal to a processor. The processor may then dynamically generate an actuator signal based at least in part on the sensor signal to more accurately drive the actuator to generate the desired haptic effect.

Figure 6:
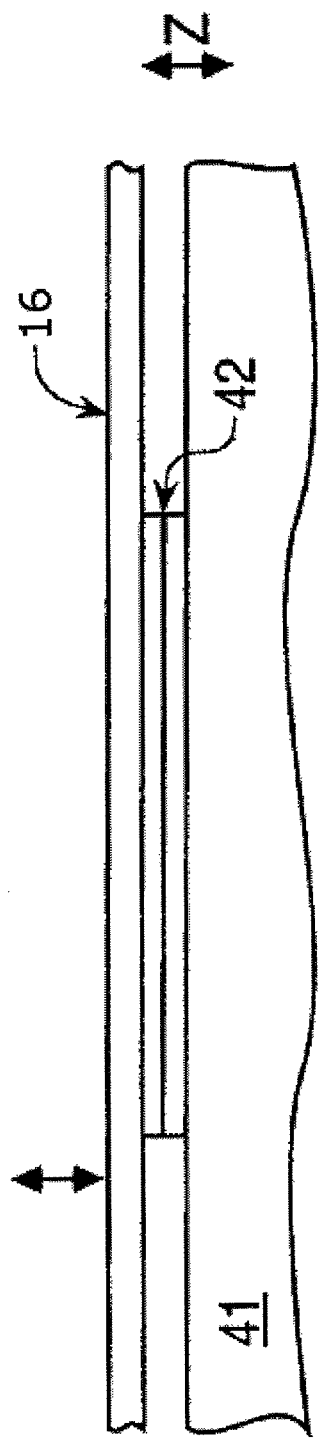

FIG. 6 is a side elevational view of the embodiment 40 of the touch-sensitive surface 16 of the present invention as shown in FIG. 5. Touch-sensitive surface 16 is directly coupled to a grounded piezo-electric actuator 42 which operates to produce a force directly on the touch-sensitive surface 16 when an electrical signal is input to the actuator. Typically, a piezo-electric actuator includes two layers which can move relative to each other when a current is applied to the actuator; here, the grounded portion of the actuator remains stationary with respect to the surrounding housing 41 while the moving portion of the actuator and the touch-sensitive surface 16 move with respect to the housing 41. The operation of piezoelectric actuators to output force based on an input electrical signal is well known to those skilled the art.

The touch-sensitive surface 16 can be coupled only to the actuator 42, or can be additionally coupled to the housing of the input device at other locations besides the actuators 42. The other couplings may be compliant connections, using a material or element such as a spring or foam. If such connections are not made compliant, then the touch-sensitive surface 16 itself may have some compliance to allow portions of the touch-sensitive surface 16 to move in response to actuator forces and to convey the haptic sensations to the user more effectively.

Figure 7:
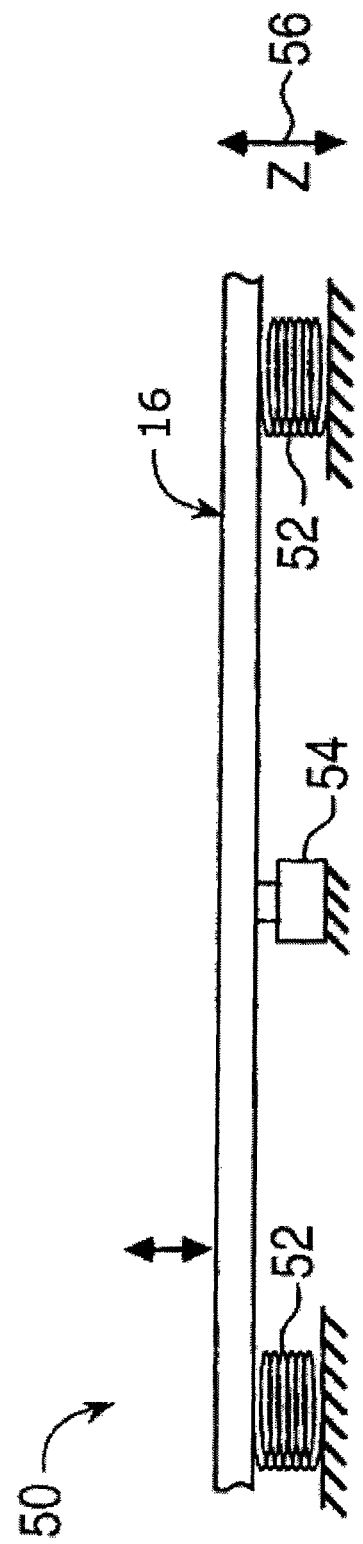

FIG. 7 is a side elevational view of another embodiment 50 of the present invention, in which the touch-sensitive surface 16 is positioned on one or more springs 52. The springs 52 couple the touchpad 16 to the rigid housing of the computer 10 and allow the touch-sensitive surface 16 to be moved along the z-axis 56. Only a very small range of motion may be required to produce effective pulses (jolts) or vibrations on the touch-sensitive surface 16. Stops (not shown) can be positioned to limit the travel of the touchpad 16 to a desired range along the z-axis.

An actuator 54 is also coupled to the touch-sensitive surface 16 to impart forces on the touch-sensitive surface 16 and cause the touch-sensitive surface 16 to move along the z-axis. In the present embodiment, actuator 54 is a linear voice coil actuator, where the moving portion (bobbin) of the actuator is directly coupled to the touch-sensitive surface 16. The actuator 54 is grounded to the input device housing and outputs a linear force on the touch-sensitive surface 16 and thus drives the touch-sensitive surface 16 along the z-axis. A short pulse or jolt can be output, or the moving portion of the actuator can be oscillated to provide a vibration having a particular desired frequency. The springs 52 cause the touch-sensitive surface 16 to return to a rest position after a force from the actuator causes the touch-sensitive surface 16 to move up or down. The springs can also provide a compliant suspension for the touch-sensitive surface 16 and allow forces output by the actuator 54 to be amplified as explained above. Different types of spring elements can be used in other embodiments to couple the touch-sensitive surface 16 to the rigid housing, such as leaf springs, foam, flexures, or other compliant materials.

In some embodiments, the user is able to push the touch-sensitive surface 16 along the z-axis to provide additional input to the computer 14. For example, a sensor can be used to detect the position of the touch-sensitive surface 16 along the z-axis, such a an optical sensor, magnetic sensor, Polhemus sensor, etc. The position on the z-axis can be used to provide proportional input to the computer, for example. In addition, other types of forces can be output along the z-axis, such as spring forces, damping forces, inertial forces, and other position-based forces, as disclosed in U.S. Pat. No. 6,563,487 entitled, "Haptic Feedback for Directional Control Pads," which is incorporated herein by reference. In addition, 3 D elevations can be simulated in the graphical environment by moving the pad to different elevations along the z-axis. If the pad 16 can be used as an analog input depending on the distance the entire pad is moved along the z-axis, and/or if kinesthetic (force) feedback is applied in a z-axis degree of freedom, then a greater range of motion for the pad 16 along the z-axis is desirable. An elastomeric layer can be provided if the touch-sensitive surface 16 is able to be pressed by the user to close a switch and provide button or switch input to the computer 14 (e.g. using contact switches, optical switches, or the like).

The voice coil actuator 54 may include a coil and a magnet, where a current is flowed through the coil and interacts with the magnetic field of the magnet to cause a force on the moving portion of the actuator (the coil or the magnet, depending on the implementation.), as is well known to those skilled in the art. Other types of actuators can also be used, such as a standard speaker, a solenoid, a pager motor, a DC motor, moving magnet actuator, smart material actuators (such as without limitation piezo-electric actuators, electro-active polymers, shape memory alloys) or other type of actuator. Furthermore, the actuator can be positioned to output linear motion along an axis perpendicular to the z-axis or along another direction different from the z-axis (rotary or linear), where a mechanism converts such output motion to linear motion along the z-axis as is well known to those skilled in the art.

The touch-sensitive surface 16 can also be integrated with an elastomeric layer and/or a printed circuit board in a sub-assembly, where one or more actuators are coupled to the printed circuit board to provide tactile sensations to the touch-sensitive surface 16. Helical springs can also be provided to engage electrical contacts. Or, multiple voice coil actuators can be positioned at different locations under the touch-sensitive surface 16.

Figure 8:
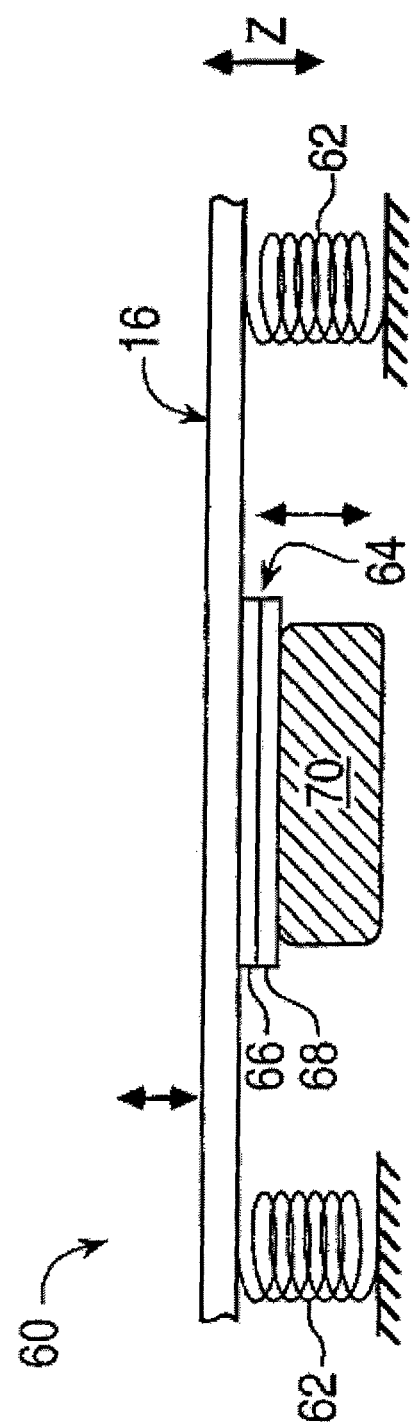

FIG. 8 is a side elevational view of a third embodiment 60 of the touch-sensitive surface 16 of the present invention. In this embodiment, The stationary portion of the actuator is coupled to the touch-sensitive surface 16, and the moving portion of the actuator is coupled to an inertial mass to provide inertial haptic sensations.

Touch-sensitive surface 16 can be compliantly mounted to the rigid housing of the input device similarly to the embodiments described above. For example, one or more spring elements 62 can be coupled between the touch-sensitive surface 16 and the housing. These springs can be helical or leaf springs, a compliant material such as rubber or foam, flexures, etc.

In this embodiment, one or more actuators 64 are coupled to the underside of the touch-sensitive surface 16. In the embodiment of FIG. 8, a piezo-electric actuator is shown. One portion 66 of each actuator 64 is coupled to the touch-sensitive surface 16, and the other portion 68 is coupled to a mass 70. Thus, when the portion 68 is moved relative to the portion 66, the mass 70 is moved with the portion 68. The mass 70 can be any suitable object of the desired weight, such as plastic or metal material. The mass 70 is moved approximately along the z-axis and is not coupled to the housing, allowing free motion. The motion of the mass 70 along the z-axis causes an inertial force that is transmitted through the actuator 64 to the touch-sensitive surface 16, and the touch-sensitive surface 16 moves along the z-axis due to the compliant coupling 62. The motion of the touch-sensitive surface 16 is felt by the user contacting the touchpad 16 as a haptic sensation. In other embodiments, the mass 70 may be moved along the x-axis or y-axis. In such embodiments, movement of the mass causes an inertial force along the corresponding axis that is transmitted by the actuator 64 to the touch-sensitive surface 16, and the touch-sensitive surface 16 moves along the corresponding axis due to the compliant coupling 62. In further embodiments, multiple inertial actuators 64 having different mass sizes may be used to provide haptic sensations in a variety of frequency ranges.

In different embodiments, other types of actuators can be used. For example, a linear voice coil actuator as described for FIG. 6 can be used, in which an inertial mass is coupled to the linear-moving portion of the voice coil actuator. Other actuators can also be used to provide inertial haptic sensations, such as solenoids, pager motors, moving magnet actuators. Furthermore, a rotary actuator can be used, where rotary output force is converted to a linear force approximately along the z-axis. For example, the rotary force can be converted using a flexure.

Merging any features of the above embodiments into a single hybrid design can also be accomplished. For example, a haptic feedback input device of the present invention may comprise both an eccentric rotating mass actuator disposed within the housing and a linear voice coil actuator coupled to the touch-sensitive surface.

Referring now to FIG. 9, FIG. 9 is a flow chart illustrating a method for providing haptic feedback to touch-sensitive input devices according to an embodiment of the present invention. The method illustrated in FIG. 9 is described with reference to the system 10 shown in FIGS. 1 and 2. The method 300 begins at step 310 when a local processor 110 receives a contact signal indicating a contact with the touch-sensitive surface 16 or movement of the input device 12. In the embodiment shown, the contact signal comprises contact information, such as a location of one or more contacts or a pressure associated with the one or more contacts. In one embodiment, the signal may be received by a host computer 14 rather than a local processor 110. In some embodiments, the touch-sensitive surface 16 may be capable of only detecting a single touch contact at a given time. In other embodiments, the touch-sensitive surface 16 may be a multi-touch touch sensitive input device capable of detecting multiple simultaneous touch contacts. In some embodiments, the touch-sensitive surface 16 may comprise an array of capacitive buttons for detecting touch contacts. In another embodiment, touch-sensitive surface 16 may comprise a touch screen operable to display graphical information. In some embodiments, the graphical information may be default mouse controls. In other embodiments the graphical information may be context sensitive controls or data based on the graphical environment displayed on host computer 14. The embodiments of the touch-sensitive surface 16 described herein may be further operable to measure a pressure or pressures applied by a single contact or multiple contacts. After receiving the signal, the method proceeds to step 320.

In step 320, the local processor 110 transmits a signal to host computer 14. In some embodiments, the signal comprises movement information describing movement of the input device or touch contact information describing the contact with the touch-sensitive device. Based on the touch contact data, the host computer 14 determines a gesture associated with the touch contact data. In some embodiments, the host computer 14 determines the gesture by comparing touch contact data with gesture data stored in a database. The host computer 14 may update the graphical environment based on the gesture associated with the touch contact data or based on the movement data. For example, the host computer 14 may display a graphical object, such as a cursor or a character in a video game, based on the movement data or the detected gesture.

At step 330, the input device 12 determines whether to generate a haptic signal. For example, in one embodiment, the input device 12 may comprise a local processor 110 in communication with a computer-readable medium comprising one or more haptic effects. In such an embodiment, the local processor 110 may be configured to determine a haptic effect based on a received contact signal from the touch-sensitive surface 16. The local processor 110 receives the contact signal and identifies a haptic effect based at least upon the contact signal and one or more haptic effects stored in the computer readable medium. Alternatively, the local processor 110 may determine that it cannot determine a haptic effect and instead will wait to receive a haptic effect from the host computer 14. For example, the computer-readable medium may not comprise a haptic effect associated with the contact or the computer-readable medium may comprise an indication that haptic effects for a received contact signal are to be commanded by the host computer 14. In another embodiment, the input device 12 may not comprise a local processor 110 and may always receive haptic signals from the host computer 14. If the input device 12 determines a haptic signal, the method 300 proceeds to step 340. However, if the input device 12 does not determine a haptic signal, the method 300 proceeds to step 335.

In step 335, the input device 12 receives a haptic signal from the host computer 14. In one embodiment, the input device 12 receives a high-level command from the host computer 14. For example, the host computer 14 may transmit a high-level message indicating a haptic effect to be output. The local processor 110 may then determine an actuator signal based upon information associated with the high-level message, such as by examining a computer-readable medium that stores information to calculate an actuator signal based on a high-level message. In one embodiment, the input device 12 receives haptic information from the host computer that may be converted directly into an actuator signal. In such an embodiment, the input device 12 may receive an actuator signal from the host computer 14 that the input device may transmit directly to the actuator. Such an embodiment may be desirable if the input device does not comprise a local processor 110 or a high-level command associated with the desired haptic effect is not available.

In step 340, local processor 110 determines an actuator signal. In one embodiment, the local processor 110 may determine an actuator signal, based at least in part on a signal indicating a contact with touch-sensitive interface device 16. In some embodiments, local processor 110 may perform calculations to determine the appropriate actuator signal. In other embodiments, the local processor 110 may perform calculations to determine the appropriate actuator signal based in part on a signal indicating a contact with touch-sensitive surface 16 or based in part on the haptic signal received from the host computer 14. In another embodiment, the processor 110 may use a lookup table to determine the actuator signal.

Then, in step 350, the input device 12 transmits the actuator signal configured to cause an actuator 18 to output a haptic effect. As described in FIGS. 3A-8, the haptic effects of the present invention may be created using a variety of different actuators. In some embodiments, the actuator may be disposed within the input device housing. In other embodiments, the actuator may be coupled to the touch-sensitive surface 16. In another embodiment, multiple actuators may be used to provide haptic feedback. For example, in one embodiment a input device 12 may comprise a eccentric rotating mass actuator disposed within the middle of the housing and a linear voice coil actuator coupled to the touch-sensitive surface 16.

Using the systems and methods described above, a significant variety of haptic effects may be provided to a touch-sensitive surface 16. In some embodiments, the haptic effects may be associated with single-touch or multi-touch inputs or gestures. In further embodiments, a haptic effect may be associated with a pressure or pressures applied by the inputs or gestures. In other embodiments the haptic effects may be associated with a graphical event displayed in a graphical environment. In still other embodiments, the haptic effect may be associated with graphical events displayed on a touch-sensitive surface 16 comprising a touch screen, for example a change in context sensitive controls. Exemplary embodiments are described below. These exemplary embodiments incorporate one or more of the embodiments described above that illustrate detection and processing of touch contacts and gestures, as well as the determining and outputting of haptic effects, and therefore will not discuss those aspects in detail with respect to each exemplary embodiment.

In one embodiment, a gesture associated with a touch contact may comprise a brief contact and release, such as a tap. In some embodiments, a tap in a specific region of the touch-sensitive surface 16, such as the top right corner, may be recognized by the input device or the host computer as a traditional right mouse click, and a tap in a second region, such as the remaining surface of the touch-sensitive interface device, may be recognized as a left mouse click. In some embodiments, the input device 12 or host computer 14 may determine that a haptic effect should be produced in response to the tap and output the haptic effect to the user of the input device 12. For example, the haptic effect may be designed to confirm that the input device 12 detected the tap or based on the type of tap. For example, in the embodiment described above the user may feel a pulse when the tap is recognized as a traditional left mouse click and a pop when the tap is recognized as a traditional right mouse click, thereby allowing the user to immediately know through his sense of touch whether he the input device 12 recognized his input as he intended. In other embodiments, the haptic effect may be designed to indicate a successful or unsuccessful attempt to interact with a software application executed on the host computer 14. For example, if a user is using the input device to control a graphical object displayed in a graphical environment, such as an arrow, and the user attempts to interact with a second graphical object by positioning the arrow to point at the second object and tapping on the touch-sensitive surface, a host computer 14 may cause a first type of haptic effect indicating a successful interaction or a second type of haptic effect indicating an unsuccessful interaction attempt. For example, in one embodiment a successful tap may cause the user to experience a vibration on the housing. In a second embodiment, a user may experience a soft pulse on the touch-sensitive surface in response to a successful tap and may experience a strong jolt on the touch-sensitive surface 16 for an unsuccessful tap. In other embodiments, the type and intensity of the haptic effect may be based on the level of pressure applied by the tap. In still other embodiments, wherein the touch-sensitive surface 16 comprises a touch screen, a visual confirmation may be displayed on the touch screen in response to a tap. In some embodiments, both a haptic effect and a visual confirmation may be provided to the user in response to the tap. The embodiments described herein provide a user with an enhanced experience by providing multi-sensory feedback in the input device in addition to any visual feedback provided by the graphical environment in response to the user input to the touch-sensitive interface device.

In another embodiment, a specific gesture associated with touch contact, such as two fingers placed in contact with the touch-sensitive surface and moved horizontally left or right (a finger drag), may be recognized by computer programs displaying pages of a book or other documents. Upon recognition of the gesture, the computer program may flip pages of the displayed document forward or backward depending on the direction of the finger drag.

Similarly, a computer program may recognize horizontal or vertical finger drags for scrolling a document vertically or horizontally. In such an embodiment, the computer program may further recognize successive finger drags in the same direction and provide a momentum or acceleration effect to the scrolling. In other embodiments, the number of pages flipped or distance scrolled may be based on the pressure applied to the touch-sensitive surface during a finger drag. In some embodiments, the input device or host computer 14 may determine that a haptic effect should be produced in response to single or multi-finger drag or successive drags. In other embodiments, one haptic effect may be provided during the finger drag and a second haptic effect upon completion of the finger drag.

In one embodiment, a vibration or sensation may simulate the feel of dragging a finger over a textured surface ("texture effect") and may be output during a finger drag and a pulse effect may be provided upon completion of the finger drag. In another embodiment, in response to successive finger drags, a series of pulse or clicks may be provided with increasing frequency for each successive finger drag to provide a feeling of increasing momentum ("momentum effect"). In some embodiments the momentum effect may be varied in relation to the speed and number of the successive finger drags providing enhanced user feel and ability to control the speed of scrolling. In still other embodiments, the type and intensity of the haptic effect may be based on the pressure applied during a finger drag. For example, linear forces may be applied to the touch-sensitive surface 16 in a direction opposite to a finger drag causing the touch-sensitive surface to move in the direction of the linear force. The intensity may be varied based on the pressure applied during the finger drag, such as to simulate the feel of flipping a few pages versus flipping fifty pages at a time.

In other embodiments, the host computer 14 may provide varying functionality based on the type of gesture associated with the touch contact and based on a region of the surface of touch-sensitive surface where the touch contact occurs. For example, the host computer 14 may interpret a finger drag in the left half of the touch-sensitive surface 16 as a page flip and interpret a similar touch contact in the right half as a smooth scroll each having corresponding haptic effect. For example, a faint vibration may be applied to the touch-sensitive surface 16 for a smooth scroll, and detent effects may be used for a page flip as described above.

In yet another embodiment, a gesture, such as placing two fingertips on the touch-sensitive surface 16 in positions separate from each other and moving the fingertips across the surface of the touchpad toward each other, or vice-versa, may be recognized as "zoom" gestures by computer programs displaying images or other graphical objects. Upon recognition of the former, the computer program may zoom in to display a closer perspective and upon recognition of the latter gesture, the computer program may zoom out to display a more distant perspective. In some embodiments the input device 12 or host computer 14 may determine that a haptic effect should be provided to the user in response to the gesture. For example, a haptic effect, such as a vibration, may be provided in response to the zoom in gesture that increases in intensity as the user's fingers get further apart. Likewise, a haptic effect may be provided in response to the zoom out gesture that decreases in intensity as the user's fingers draw closer together. In one embodiment, a haptic effect, such as a vibration, may be provided to indicate that further zooming in or out is not available once the closest or most distant perspective has been displayed. For example, a force may be applied to the touch-sensitive surface notifying the user that further zooming is not available. In an alternative embodiment, a computer program may recognize a continuous contact in one region of the touch-sensitive surface, such as the left half, and may zoom in to a closer perspective based on the contact. Similarly, a computer program may also recognize a continuous contact with a second region of the touch-sensitive surface, such as the right half, and may zoom out to a more distant perspective based on the contact. Haptic effects similar to those described above in relation to zooming gestures also may apply to this latter embodiment using regions.

In other embodiments, gestures and corresponding haptic feedback may be used to provide an enhanced simulation experience. For example in relation to a video game application involving melee combat, a gesture associated with touch contact, such as a vertical finger drag, may be recognized by the video game application and cause the application to update the display to show a controlled character throwing a jab. In another embodiment, a gesture may comprise a horizontal finger drag causing the controlled character to throw another type of punch, such as a hook or a cross. In other embodiments, a gesture may comprise a circular finger drag causing the controlled character to perform a power or specialty move, such as an uppercut or a haymaker. In other embodiments, the pressure applied during a gesture may be used to differentiate between the normal punch associated with the gesture and a "super" or "energy" version of the punch that consumes an amount of a character's energy. One of ordinary skill in the art would recognize that these embodiments may also be used for many forms of combat, such as sword-fighting, wrestling, and martial arts. In one embodiment, gestures related to attack maneuvers may be recognized in one region of the touch-sensitive surface, and a gesture for shielding, such as a continuous contact, may be recognized in a second region. In addition, haptic effects may be used to provide a more realistic experience. In one embodiment, when a user performs a gesture to throw a punch, a haptic effect may be provided to indicate a successful attack and an alternate haptic feedback may be provided to indicate a failed attack attempt. For example, a pulse or pop may be applied to the touch-sensitive surface for a successful attack, and a vibration may be applied to the input device housing for a failed attack In an alternative embodiment, a pulse or pop is provided for a successful attack, but no haptic effect is provided in the case of a failed attack thereby providing a stark contrast between a successful attack and a failed attack to lessen the chance of confusion for the user. In another embodiment, the intensity of the haptic effect may be varied based on the pressure applied during the gesture. For example, lower intensity may be used for the normal version of an attack corresponding to a first pressure, and a higher intensity may be used for a "super" or "energy" version of an attack corresponding to second pressure. In one such embodiment, the first pressure may comprise a lower pressure than the second pressure.

In some embodiments, the intensity of a haptic effect for a successful punch may be varied to indicate a level of damage inflicted on the target or to differentiate between a direct hit and a glancing or partially blocked attack. In addition, a haptic effect could be generated as the user performs the punch gesture, such as to indicate the speed of the punch or to indicate that energy is being stored to release a special attack, or that a special attack is ready. For example, as the user is performing a punch gesture, a vibration may be applied to the touch-sensitive surface 16 and the intensity of the vibration may be based on the speed in which the user is performing the gesture. In another example, a pulse may be repeatedly applied to the input device housing at a specific frequency to indicate that a power move such as an uppercut is available. In other embodiments, a haptic effect may be provided to indicate successfully shielding an attack from an opponent. For example, as the user maintains contact with a region of the touch-sensitive surface to use a shield functionality, a jolt may be provided to the region in a substantially linear direction perpendicular to the surface of the touch-sensitive surface 16 to simulate a blow to the shield. In another embodiment, a force may be applied to the touch-sensitive input device 16 along the x-axis or along the y-axis causing the touch-sensitive surface 16 to move in the direction of the force thereby simulating the direction of the shielded attack. The exemplary embodiments described in this paragraph, alone or in combination, may enhance the interactive experience with a video game thereby providing an additional level of excitement and user satisfaction.

In addition, as described above, the touch-sensitive surface 16 may comprise a touch screen. Similar to the embodiment illustrated in FIG. 9 and described above, upon receiving a signal indicating a touch contact or movement of the input device 12, the local processor 110 may transmit a signal comprising movement data or touch contact data to the host computer 14. The host computer 14 may then update the graphical display based on the movement data or a gesture associated with the touch contact data. In further embodiments, the host computer 14 may also determine a graphical representation to be displayed on the touch screen of input device 12 and then transmit a display signal to the input device 12. In other embodiments, the host computer 14 may determine and transmit a display signal and a haptic signal. Next, the local processor 110 may determine a graphical image to be displayed based on the display signal. In other embodiments, the local processor may determine a graphical image to be displayed and an actuator signal based on the display signal. In still other embodiments, the local processor 110 may determine a graphical image to be displayed based on the display signal and determine an actuator signal based on the haptic signal. Then the local processor 110 may cause the touch screen to display a graphical representation of controls or data. In other embodiments the local processor 110 may also transmit a actuator signal to the actuator 18 causing it to output a haptic effect.

The use of a touch screen allows for additional functionality operable to enhance a user's experience. For example, a touch screen may display graphical representations of available controls. Graphical representations of controls may include representations of scroll wheels, buttons, directional pads, steering wheels, weapons and numerous other useful representations. The graphical representations may be used to define regions where a corresponding gesture associated with touch contact may be recognized. In some embodiments, the graphical representations on the touch screen may be context-sensitive. For example, in a multi-player football video game the touch screen may display data and controls used to view and select plays in between downs, controls to audible and to snap the ball immediately preceding the beginning of a play, controls to hand off or pass the ball after the snap, and controls relating to evading tackles once a running back or receiver is attempting to advance the football down the field such as controls for sprinting, side-stepping, spinning, stiff-arming, and jumping. In some embodiments, haptic effects may be provided in relation to the use of context sensitive controls. For example, a directional effect may be provided in response to and in the relative direction of a horizontal finger drag for performing a side-step maneuver. In another embodiment, as a user holds a finger on the touch screen to perform a stiff-arm, a jolt or pop may be applied to the touch screen to indicate application of the stiff arm to an opposing player. Furthermore, the touch screen may provide a visual confirmation of touch contact user input.

In addition to providing haptic effects related to user inputs, haptic effects may be provided in coordination with contact received by the character controlled, such as a tackle or attempted tackle. For example, a soft pulse may be used for a glancing blow, a more intense vibration may be used for a hard tackle, and a strong jolt may be used to indicate suffering an injury from a hard tackle.

In the multi-player football video game example described above, each player may view and select plays using the touch screen on their respective input devices rather than by looking at a common display. Consequently, a player may not be able to view and potentially determine the play selected by an opposing player. Furthermore, in the event that there are multiple players on each team, the touch screen may be used to display a play, or to output a haptic effect indicating the play, selected by a teammate as well as any modifications to the play through an audible.

General Considerations

Use of the conjunction "or" herein is intended to encompass both inclusive and exclusive relationships, or either inclusive or exclusive relationships as context dictates.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer or an input device may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps of methods described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A mouse input device comprising:
   a housing having an exterior surface;
   a touch-sensitive surface disposed within the exterior surface of the housing, wherein the touch-sensitive surface comprises a touch screen and is configured to transmit a contact signal indicating a contact with the touch-sensitive surface;
   a sensor disposed within the housing, the sensor configured to sense movement of the mouse input device and to transmit a sensor signal indicating movement of the mouse input device;
   an actuator disposed within the housing, the actuator configured to output a haptic effect based on an actuator signal; and
   a processor in communication with the touch-sensitive surface, the sensor, the actuator, and a host computer implementing a graphical environment, the processor configured to:
      transmit, to the host computer, a signal comprising contact information associated with the contact signal,
      receive a haptic signal from the host computer, wherein the haptic signal is based on the contact information, and
      determine the actuator signal based at least in part on the haptic signal.

2. The mouse input device of claim 1, wherein the processor is further configured to:
   receive the contact signal from the touch-sensitive surface,
   determine the actuator signal based at least in part on the contact signal, and
   transmit the actuator signal to the actuator.

3. The mouse input device of claim 1, wherein the contact comprises a gesture.

4. The mouse input device of claim 3, wherein the gesture comprises a tap and the actuator signal is based upon a location of the tap.

5. The mouse input device of claim 3, wherein the gesture comprises a drag and the actuator signal is based upon a direction of the drag.

6. The mouse input device of claim 3, wherein the gesture comprises a repeated drag and the actuator signal is based on a momentum associated with the repeated drag.

7. The mouse input device of claim 3, wherein the gesture comprises a zoom gesture and the actuator signal is based on the zoom gesture, the actuator signal configured to cause a vibration based on an amount of zoom or a pop if the amount of zoom reaches a maximum or minimum.

8. The mouse input device of claim 1, wherein the touch-sensitive surface comprises a multi-touch touch-sensitive surface.

9. The mouse input device of claim 1, wherein the touch screen is operative to display a visual confirmation of the contact.

10. The mouse input device of claim 1, wherein the touch screen is configured to display one or more graphical controls based on a display signal, a configuration of the graphical controls based at least in part on a position of a controlled graphical object in a graphical environment, and the actuator is configured to generate a haptic effect based on a second actuator signal, the second actuator signal based on a change of the configuration of the graphical controls.

11. The mouse input device of claim 1, wherein the actuator comprises a first actuator and a second actuator.

12. The mouse input device of claim 11, wherein the first actuator is configured to output a haptic effect to the touch-sensitive surface and the second actuator is configured to output a haptic effect to the housing.

13. The mouse input device of claim 1, wherein the touch-sensitive surface comprises an array of capacitive buttons.

14. The mouse input device of claim 1, wherein the contact signal comprises contact pressure data indicating an amount of pressure applied by the contact.

15. The mouse input device of claim 14, wherein the actuator signal is based at least in part on the contact pressure data.

16. A method for capturing input data and providing haptic feedback effects to a user of a mouse input device, the method comprising:
   receiving a contact signal indicating a contact with a touch-sensitive surface of the mouse input device, the mouse input device comprising a housing and a sensor, wherein the touch-sensitive surface comprises a touch screen and is disposed within an exterior surface of the housing, the sensor disposed within the housing and configured to sense movement of the input device and to transmit a sensor signal indicating movement of the mouse input device;
   transmitting, to a host computer, a signal comprising contact information associated with the contact signal;
   receiving a haptic signal from the host computer, wherein the haptic signal is based on the contact information;
   determining an actuator signal based at least in part on the haptic signal; and
   transmitting the actuator signal to an actuator, the actuator configured to output a haptic effect based at least in part on the actuator signal.

17. The method of claim 16, further comprising determining a gesture based on the contact signal.

18. The method of claim 17, wherein the gesture comprises a tap and the actuator signal is based upon a location of the tap.

19. The method of claim 17, wherein the gesture comprises a drag and the actuator signal is based upon a direction of the drag.

20. The method of claim 17, wherein the gesture comprises a repeated drag and the actuator signal is based on a momentum associated with the repeated drag.

21. The method of claim 17, wherein the gesture comprises a zoom gesture and the actuator signal is based on the zoom gesture, the actuator signal configured to cause a vibration based on an amount of zoom or a pop if the amount of zoom reaches a maximum or minimum.

22. The method of claim 16, wherein the touch-sensitive surface comprises an array of capacitive buttons.

23. The method of claim 16, wherein the contact signal comprises contact pressure data indicating an amount of pressure applied by the contact.

24. The method of claim 23, wherein the actuator signal is based at least in part on the contact pressure data.

25. The method of claim 16, wherein the touch-sensitive surface comprises a multi-touch touch-sensitive surface.

26. The method of claim 16, further comprising:
generating a display signal, the display signal configured to cause the touch screen to display a visual confirmation of the contact, and
transmitting the display signal to the touch screen.

27. The method of claim 16, further comprising:
generating a display signal, the display signal configured to cause the touch screen to display one or more graphical controls, a configuration of the graphical controls based at least in part on a position of a controlled graphical object in a graphical environment,
generating a second actuator signal based on a change of the configuration of the graphical controls, the second actuator signal configured to cause a second haptic effect configured to indicate a change in the configuration of the graphical controls,
transmitting the display signal to the touch screen, and
transmitting the second actuator signal to the actuator.

* * * * *